No. 637,192. Patented Nov. 14, 1899.
E. E. WHIPPLE, Dec'd.
H. M. WHIPPLE, Administratrix.
WEEDER.
(Application filed Mar. 23, 1899.)
(No Model.) 2 Sheets—Sheet 1.
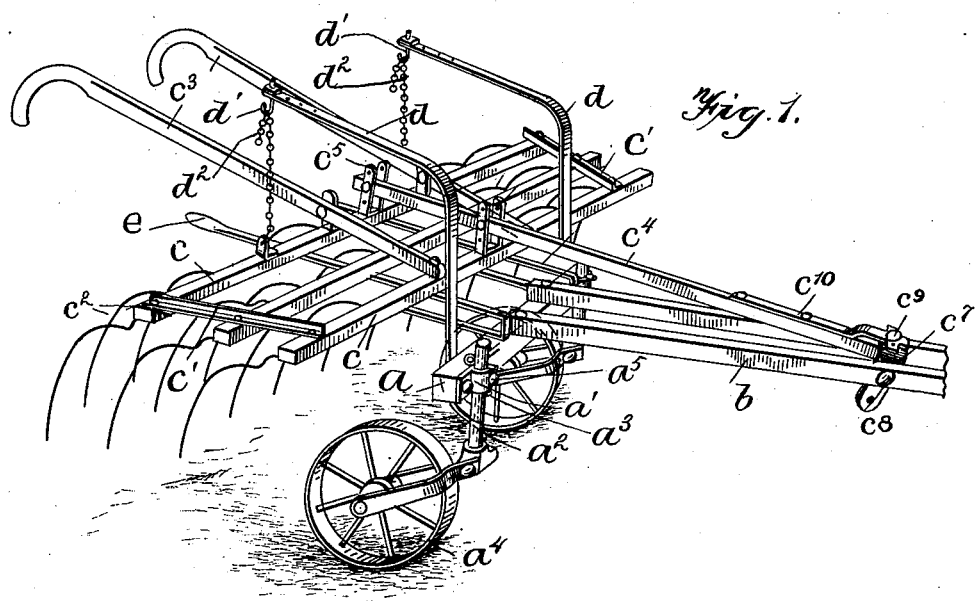
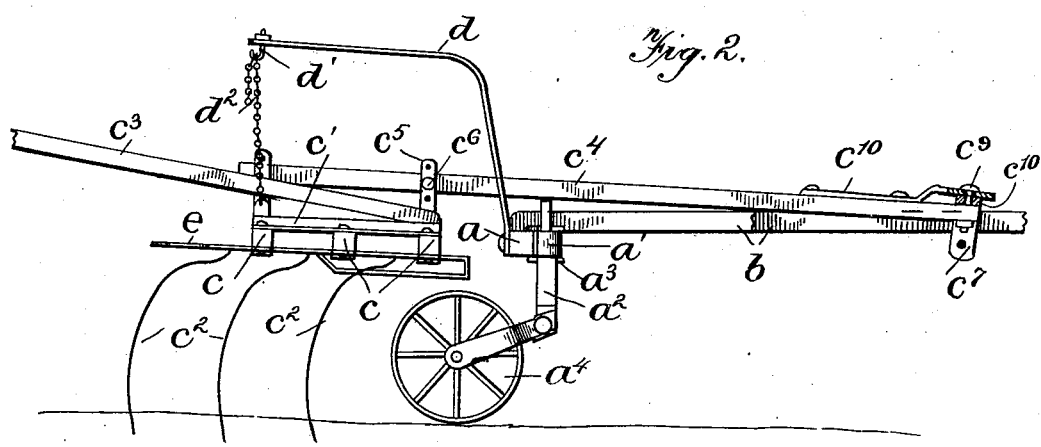
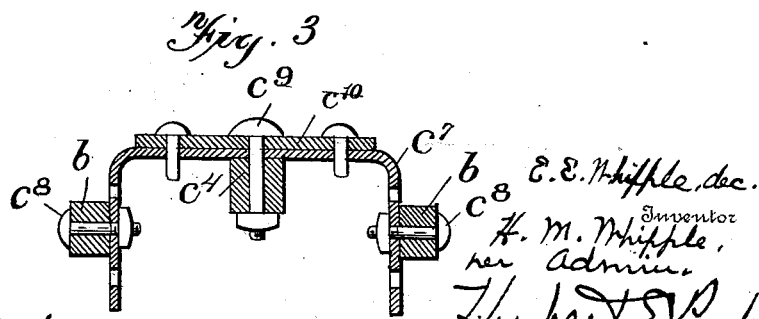

No. 637,192. Patented Nov. 14, 1899.
E. E. WHIPPLE, Dec'd.
H. M. WHIPPLE, Administratrix.
WEEDER.
(Application filed Mar. 23, 1899.)
(No Model.) 2 Sheets—Sheet 2.
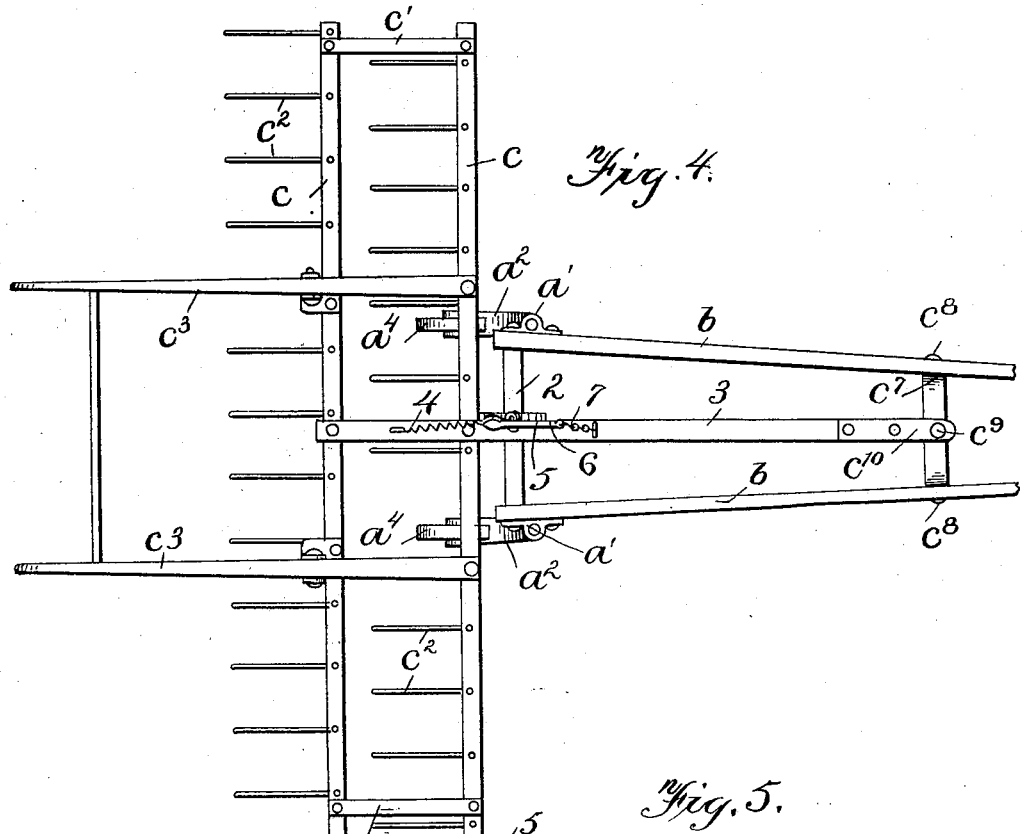
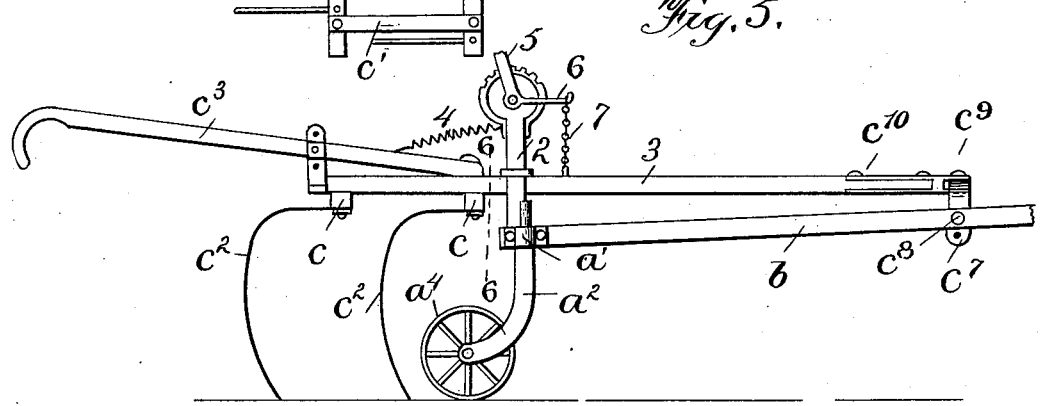
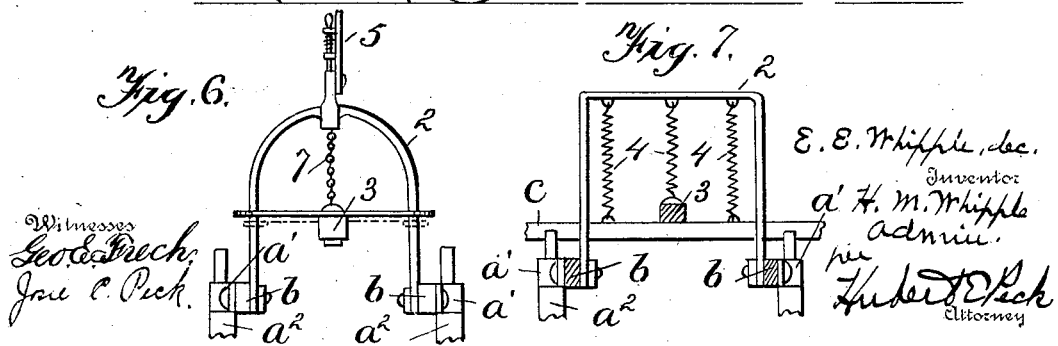

UNITED STATES PATENT OFFICE.

HANNAH M. WHIPPLE, OF DETROIT, MICHIGAN, ADMINISTRATRIX OF EFFINGER E. WHIPPLE, DECEASED.

WEEDER.

SPECIFICATION forming part of Letters Patent No. 637,192, dated November 14, 1899.

Application filed March 23, 1899. Serial No. 710,244. (No model.)

*To all whom it may concern:*

Be it known that EFFINGER E. WHIPPLE, deceased, late a citizen of the United States and resident of Detroit, in the county of Wayne and State of Michigan, did invent certain new and useful Improvements in Weeders; and I, HANNAH M. WHIPPLE, administratrix, do hereby declare the following to be a full, clear, and exact description of the invention, such as will enable others skilled in the art to which it appertains to make and use the same.

This invention relates to certain improvements in agricultural implements, and more particularly to improvements in implements in the art and trade generally termed "weeders;" and the objects and nature of the invention will be obvious from the following explanation when considered in the light of the constructions shown in the drawings as examples out of many constructions within the spirit and scope of this invention.

The invention consists in certain novel features in construction, combinations, and in arrangements of parts and details, as more fully and particularly pointed out and described hereinafter.

Referring to the accompanying drawings, Figure 1 is a perspective view of the implement supported in an elevated position for transportation. Fig. 2 is a side elevation showing the tooth-gang in working position. Fig. 3 is a detail cross-sectional view through the coupling between the front of the coupling-pole and the tongue or supporting draft-frame of the implement. Fig. 4 is a top plan view of an implement differing in some details of construction from the device shown in the foregoing figures. Fig. 5 is a side elevation of the implement shown in Fig. 4. Fig. 6 is a sectional view on the line 6 6, Fig. 5. Fig. 7 is a view corresponding to Fig. 6, but showing a somewhat-different arrangement.

In carrying out this invention a main draft or supporting frame is provided, having suitable ground-supports. The wide transversely-arranged gang is made up of usually rigid parallel tooth-bars carrying teeth arranged in any desired manner, as in rows. The gang has a long drag-bar connection with said supporting-frame, and suitable means are provided to apply the draft to the gang and supporting-frame.

In the construction shown in Figs. 1 and 2 the wheeled or supporting frame comprises a forwardly-extending preferably rigid draft or coupling connection at the rear end, provided with suitable ground-supports, such as wheels, which maintain the rear end of said frame the proper distance above the ground. In the specific example shown in said figures said supporting-frame comprises the straight cross-beam, axle, or support $a$, to which a long forwardly-extending draft pole or tongue $b$ is rigidly and centrally secured, so that the said axle, if desirable, extends laterally short distances beyond the rear end of the tongue. The tongue is shown tapering forwardly and consisting of two long beams separated at their rear ends where secured on the axle and converging forwardly. Suitable draft appliances are coupled to this tongue usually in advance of its rear end, so that ordinarily the draft-animals are arranged on both sides of the tongue. The rear end of the supporting-frame thus formed is held elevated a distance above the ground by any suitable means. Journal-blocks $a'$ are shown secured rigidly to the front edge of the axle and near the opposite ends thereof, respectively. Two caster-wheels are provided to carry the rear end of the supporting-frame. Each caster-wheel frame $a^2$ is shown with the upwardly-extending vertical spindle passing loosely through one of said journal blocks or boxes, so that the rear end of the supporting-frame can be adjusted vertically thereof and secured at the desired height by vertically-adjustable cross or linch pins $a^3$, passed transversely through the spindle and above and below the journal-block. The caster-wheel frames extend rearwardly from the lower ends of the spindles and have the comparatively small wheels $a^4$ mounted in their rear ends. The arrangement is such that the wheel-axes are preferably located a distance in rear of the vertical transverse plane, including the axle $a$, whereby the implement, as hereinafter set forth, is in a measure balanced on said supporting-wheels.

The caster-wheel frames can turn or swing laterally independently of the supporting-frame or, if desired, be locked to the supporting-frame by suitable means, such as pins $a^5$, passed through the journal-boxes into said spindles of the caster-wheel frames, as shown in Fig. 1.

The transversely-arranged tooth-gang is preferably much wider or longer transversely than the supporting-frame. The gang-frame is here shown composed of several parallel separated tooth-bars $c$, rigidly secured together by cross-bars $c'$ and carrying suitable long soil-stirring teeth $c^2$, suitably arranged, usually in rows.

It is obvious that the tooth-bars can be otherwise arranged and otherwise secured than rigidly. The gang-frame can, if desired and used without a riding attachment, be provided with rearwardly-extending handles $c^3$, secured to the tooth-bars. The wide gang is arranged, preferably, parallel with the axle of the supporting-frame, and these members are arranged one in advance of the other.

In the particular example shown the gang is arranged in rear of the wheeled supporting-frame—that is, the supporting-frame extends forwardly from a point in front of the central portion of the gang which is located a distance in rear of said frame.

The gang is provided with a drag, draft, or coupling connection rigid therewith and arranged transversely thereof and parallel with the line of draft. This connection $c^4$ is preferably a rigid bar secured rigidly transversely across the central portion of the gang-frame and projected forwardly over the supporting-frame and loosely coupled thereto at an advanced point in front of the axle and gang. The rear end of said bar $c^4$ is usually secured removably and adjustably to and across the tooth-bars of the gang-frame. For instance, several of the tooth-bars at about the central portions of their lengths are shown provided with the parallel rigid uprights or plates $c^5$. The plates of the various tooth-bars are alined and the rear portion of the bar $c^4$ is removably fitted between said uprights and is removably secured thereto and rigid with the gang-frame by bolts $c^6$ transversely through the said uprights and through the bar $c^4$. The uprights are preferably formed with vertical series of bolt-holes, as shown, so that the gang and the bar $c^4$ can be shifted or adjusted vertically with respect to each other and the securing-bolt $c^6$ passed through the proper holes in the uprights to lock the parts together in the desired relative adjustment. As set forth hereinafter, the gang of teeth can be thus leveled and interchangeable gangs of different kinds of teeth can be employed and attached to or removable from the implement. The bar $c^4$ is shown extending forwardly above the center of the axle and longitudinally and centrally of the open space between the two beams forming the tongue. The front end of the bar $c^4$ is confined centrally to the inverted-U-shaped coupling or plate $c^7$. This connection or coupling $c^7$ is arranged between the beams forming the tongue and has depending ends at the near edges of said beams and coupled thereto, respectively, by the horizontal pivot-bolts $c^8$, so that the said connection $c^7$ can swing vertically on said pivot-bolts. The ends of the connection $c^7$ are shown with vertical series of bolt-holes, so that the bolt $c^8$ can be removed and placed in different holes, and thereby raise and lower the upper portion or body of the connection $c^7$. However, it is not necessary or indeed essential to provide this vertical adjustment of the connection $c^7$. The front end of the coupling-bar $c^4$ is shown crossing the center of the connection $c^7$ and arranged beneath the same and connected thereto by the vertical pivot or coupling bar $c^9$.

$c^{10}$ is a plate rigidly secured on the bar $c^4$ and projecting loosely over the connection $c^7$ and having the pivot-bolt $c^9$ passed therethrough. This plate $c^{10}$ has lateral extensions or arms over the connection $c^7$. Said arms are provided with vertical holes coinciding with corresponding holes in the connection $c^7$, so that bolts or pins can be passed through the plate $c^{10}$ and the connection $c^7$ on each side of the pivot-bolt $c^9$, and thereby lock the draft or coupling bar $c^4$ and the gang against lateral play or swing independently of the supporting-frame.

It will be observed that the gang can move vertically independently of the supporting-frame by swinging from the center or axis in which the bolts $c^8$ are located, the coupling-bar $c^4$ and frame or connection $c^7$ swinging therewith. The gang is thus coupled to an advanced point or portion of the supporting-frame and with a part of the tongue intermediate of the length thereof and a considerable distance in advance of the gang itself and the axle and wheels, whereby the gang has an extended drag-bar connection and reach, enabling the teeth of the gang to be maintained approximately level, in addition to certain other advantages and new results which are attained.

If desired, spring devices can be provided to partially counterbalance the weight of the very long heavy gang-frame and its teeth, and thereby enable the operator to easily lift the same and hold the same down to its work with the proper pressure and to otherwise conveniently control and operate the gang in performing its proper functions. Various devices and arrangements can be provided for this purpose, and it is not desired to limit the invention in this regard.

In Figs. 1 and 2 strong plate-spring uprights $d$ $d$ are shown at their lower ends secured to opposite end portions of the axle and extending upwardly and thence rearwardly a considerable distance above the opposite portions of the gang-frame. Suitable detachable supports or connections extend or depend from the free ends of these springs to the gang-frame, preferably to the rear portion or rear tooth-beam thereof. For this purpose hooks $d'$ are shown secured removably to the rear ends of said springs and adjustable longitudinally thereof by reason of the series of bolt-holes and chains $d^2$, secured to the end portions, respectively, of the rear tooth-bar, so that desired links of the chains can be caught in said hooks and whereby the lengths of the chains between the hooks and gang-frame can be varied by catching different links in said hooks. The free ends of the strong plate-springs tend to constantly spring upwardly, and consequently exert a constant lifting pull on the gang, the strength of which pull can be varied by adjusting the parts according to the weight of the particular gang to which the supporting attachment is applied or according to the desires of the particular operator. If desired, the gang can be lifted with its teeth clearing the ground and the chains then caught up on the hooks, so as to hold the gang thus elevated for transportation with its teeth clear of the soil and its weight carried by the wheeled support without providing other upholding devices or stops. However, in said Figs. 1 and 2 stop or upholding devices are shown, although the invention is not limited to the employment thereof, particularly where spring devices are provided of such a nature as to be capable of thus upholding the gang, although in the present instance the spring devices and the stop devices really perform their independent functions, and the stop devices when employed will obviate the necessity of the springs carrying and upholding the weight of the gang.

As an example of stop devices which can be employed, Figs. 1 and 2 show slidable rigid bars $e\ e$, arranged transversely of the gang-frame near the end portions thereof, respectively. These slides $e\ e$ are usually loosely confined to and crossing the tooth-bars, and each is of such length that when the gang-frame is elevated for transportation the slides can be pushed forwardly from the rear to project such a distance in advance of the gang as to project over and rest on the rear of the wheeled supporting-frame, and thereby uphold the gang and stop downward movement thereof and relieve the spring devices. These slides usually are confined to the under edges of the tooth-bars and have rear handle ends, and when it is desired to drop the gang the slides can be drawn rearwardly from the wheeled supporting-frame, the gang preferably being slightly raised during such operation to take the pressure off the slides.

It is obvious that other arrangements of stop mechanisms can be provided to uphold the gang-frame on the wheeled support for transportation, and this invention is not limited to the specific construction shown.

An implement constructed in accordance with the broad invention disclosed herein is of almost universal adaptability on the farm, as a number of interchangeable gangs can be provided having different forms and arrangements of teeth for various kinds of work. To release one gang-frame from the attachment, it is only necessary to remove the two bolts uniting the same to the drag or coupling bar. Another gang can then be inserted and secured by the two bolts. The chains can be detachable from the gang-frame and the same chains applied to each gang, or each gang can have chains and stops secured thereto. Each gang can be coupled with the wheeled support to swing laterally independently thereof by the instrumentalities hereinbefore described, in which case it is preferable to lock the wheel-frames to the axle $a$, as before described. When the gang is locked to the wheeled support against lateral play, it is preferred to allow the caster-wheel frames independent lateral play, as before described, by removing the locking-pins extending into the said wheel-frame spindles.

By employing the long coupling-bar and the union between the gang and wheeled support at an advanced point the gang can be kept approximately level when working and can be moved vertically to work a greater or less depth in the soil and still maintain the tooth-points of the several beams approximately level, and in addition to these advantages the wheels are also so arranged as to practically balance the entire implement.

In the construction on Sheet 2 of the drawings the caster-wheel frames are mounted at the sides or end portions of the beams forming the forwardly-extending draft-tongues, and an axle projecting beyond the tongues is not employed, such as shown in Figs. 1 and 2, but the axle 2 is shown arched upwardly between the beams of the tongue and at its lower end secured to the ends of such beam.

The coupling or draft bar 3 of the gang is secured across and directly down on the tooth-bars of the gang and extends forwardly of the draft-tongue beneath the arched axle or rear cross-bar thereof. At its front end the bar 3 is pivoted directly to the swinging connection or cross-plate $c^7$, pivoted at its ends to the beams of the tongue to swing vertically. The plate $c^7$ is pivotally joined to the tongue about as in Figs. 1 and 2.

Fig. 5 shows a retractive coiled spring 4, secured to the top of the arched axle 2 and also to the gang-frame to exert a constant upward pull thereon, and hence in a measure balance the weight of said gang.

In Fig. 7 a number of such springs are shown secured to the arched axle and the gang-frame, and also to the bar 3. In the construction shown by Fig. 7 the gang is permitted free lateral swing from the vertical pivot at the front end of the bar 3. In Fig. 6 connections are shown secured to the bar 3 and extending therefrom to the vertical sides of the arched axle and slidable vertically thereon as the gang rises and falls. These connections are designed for application when it is desired to hold the gang against independent lateral play.

If desired, a lifting device can be provided to elevate the gang and uphold the same in such position with its teeth clear of the soil. For instance, in Figs. 4, 5, and 6 a vertically-swinging hand-lever 5 is mounted at the top of the axle and provided with an ordinary toothed segment and locking-pawl and with suitable lifting connections to the gang or some part thereof. As shown, the lever has a rigid lateral end 6, to which a chain 7 is attached and which depends to and is connected with the bar 3 of the gang. By this means the gang can be elevated whenever desired by rocking the lever and the gang will be held in an elevated position for transportation by the locking mechanism of the lever. In this construction also a number of tooth-gangs having different teeth can be used interchangeably with the same wheeled support; but instead of separating the gangs from the long drag-bar, as in the construction of Fig. 1, each gang is shown with a drag-bar 3 fixed thereto, and the gangs are attached to and detached from the wheeled support by inserting or removing the front vertical pivot-bolt $c^9$.

It is evident that various changes and modifications might be resorted to without departing from the spirit and scope of this invention, which is broad in scope and not limited to the specific constructions set up.

Having thus fully described the invention, what is claimed is—

1. An agricultural implement comprising a tooth-gang frame including several connected tooth-bars having a single central forwardly-extending drag-bar, a wheeled supporting-frame having a forward extension, the front end of said drag-bar coupled at an advanced point with said wheeled supporting-frame, substantially as described.

2. A wheeled supporting-frame in combination with a transversely-arranged tooth-gang frame having a forwardly-extending central drag-bar connection coupled loosely to said wheeled supporting-frame at an advanced point thereof, substantially as described.

3. An agricultural implement, comprising a supporting-frame having supporting-wheels at its rear portion, a laterally and vertically movable tooth-gang frame having a rigid centrally forwardly extending draft-bar loosely connected with said supporting-frame at a distance in advance of its rear wheeled frame, substantially as described.

4. In combination a forwardly-extending supporting-frame having laterally-movable caster-wheel frames at its rear carrying caster-wheels, means for locking the caster-wheel frames against lateral independent movement when desired, the wide transversely-arranged tooth-gang having a drag-bar connection with an advanced portion of the supporting-frame to permit independent lateral and vertical play of the tooth-gang and means for locking the connection to prevent independent lateral play of the tooth-gang when desired, substantially as described.

5. A wide transversely-arranged tooth-gang in combination with a wheeled supporting attachment, a long drag-bar connection between the tooth-gang and supporting frame, and mechanism detachably and rigidly securing the drag-bar connection to the tooth-gang frame whereby various tooth-gang frames can be used interchangeably on the same attachment, substantially as described.

6. In combination, a wheeled supporting-frame, a wide transversely-arranged tooth-gang frame, a single long drag-bar connection between the tooth-gang frame and the wheeled supporting-frame, arranged centrally of the tooth-gang frame, and adjustable coupling mechanism, whereby the tooth-gang frame can be leveled with respect to the wheeled supporting-frame, substantially as described.

7. A wheeled supporting-frame, a tooth-gang frame, a long drag-bar connection between the tooth-gang frame and the wheeled supporting-frame, said tooth-gang frame having uprights and adjustable securing means locking the drag-bar to the uprights in vertical adjustment, substantially as described.

8. In combination, a tongue having supporting-wheels at its rear end, a tooth-gang frame having a draft-bar extending forwardly, a transverse connecting-frame to which said bar is coupled by a vertical pivot, the ends of said connecting-frame being coupled to an intermediate portion of said tongue by horizontal pivots to swing vertically, substantially as described.

9. In combination, a wheeled supporting-frame having supporting-wheels at its rear portion, a wide transversely-arranged gang having a single central long drag-bar connection with an advanced point of said supporting-frame, and supporting mechanism whereby the gang is held elevated with its teeth clear of the soil and its weight thrown onto the supporting-frame, substantially as described.

10. In combination, a supporting-frame having carrying-wheels at its rear portion, a vertically-movable gang having long drag-bar connection with said supporting-frame and adjustable supporting mechanisms whereby the tooth-gang can be held elevated from the supporting-frame with its teeth clear of the soil, substantially as described.

11. In combination a supporting-frame having rear carrying-wheels, a vertically-movable wide transversely-arranged tooth-gang having a central long drag-bar connection with said supporting-frame and adjustable lifting and supporting means carried by the supporting-frame and connected with the tooth-gang, substantially as described.

12. In combination, a wheeled supporting-frame having spring-uprights, a wide transversely-arranged tooth-gang having long drag-bar connection with the supporting-frame and adjustable connections between the free ends of said spring-uprights and the tooth-gang, substantially as described.

13. In combination a rigid supporting-frame having rear carrying-wheels in combination with the wide transversely-arranged vertically and laterally movable tooth-gang frame having a long drag-bar connection with the supporting-frame at a point in advance of the wheels, and counterbalancing spring devices between the supporting-frame and the tooth-gang, substantially as described.

14. A supporting-frame, having carrying-wheels at its rear end, plate-spring supports extending upwardly and rearwardly from the rear end of the supporting-frame, the vertically-movable transversely-arranged tooth-gang frame having long drag-bar connection with said supporting-frame, and flexible adjustable supports depending from the free rear ends of said spring-supports to the tooth-gang, thereby counterbalancing the tooth-gang permitting the same to be held in an elevated position by shortening said flexible connections, substantially as described.

15. A wheeled supporting-frame, to which the draft is applied in combination with a transversely-arranged vertically-movable tooth-gang frame having long drag-bar connection with said supporting-frame and adjustable stops carried by the tooth-gang frame whereby when the tooth-gang frame is elevated the stops can be adjusted to engage the supporting-frame.

16. A wheeled supporting-frame, in combination with a tooth-gang frame having a draft-bar connection with said supporting-frame coupled loosely thereto and permitting vertical and lateral play of said gang-frame independently of said supporting-frame, and adjustable means whereby the drag-bar connection can be locked with the supporting-frame against lateral play, and can be released to permit lateral play, substantially as described.

17. A forwardly-extending wheeled supporting-frame, in combination with a tooth-gang having a rigid drag-bar secured across the central portion thereof and extended forwardly and coupled with said supporting-frame, and counterbalancing spring mechanism interposed between said gang and said frame, substantially as described.

18. A wheeled supporting-frame, in combination with a vertically-movable tooth-gang having a central long drag-bar connection with said frame, the frame having rearwardly-extending wheel-frames, whereby the gang approximately counterbalances with said frame, on the wheels, substantially as described.

19. A wheeled supporting-frame, in combination with a transversely-arranged tooth-gang having a central long drag-bar connection with said frame, and a spring mechanism carried by said frame and exerting upward tension on said gang, substantially as described.

20. A wheeled supporting-frame carrying an upright-spring support, in combination with a tooth-gang frame having a drag-bar connection with said frame and connected with said support, substantially as described.

21. A wheeled supporting-frame, in combination with a vertically-movable tooth-gang having a drag-bar connection with said frame, said frame provided with an upright spring extending rearwardly above said gang and exerting upward tension thereon, substantially as described.

22. A wheeled supporting-frame carrying a spring-support, in combination with a vertically-movable tooth-gang connected with said frame and connected with the free portion of said spring which exerts upward tension on the gang, substantially as described.

23. A wheeled supporting-frame having an upwardly and laterally deflected spring, in combination with a vertically-movable tooth-gang, a connection from the gang, and coupling means between the connection and spring adjustable longitudinally of the spring, substantially as described.

24. In combination, a wheeled supporting-frame, a vertically-movable tooth-gang, and a movable stop, whereby the downward movement of the gang can be limited and the gang held elevated and supported on said frame, substantially as described.

In testimony whereof I have hereunto set my hand in the presence of two subscribing witnesses.

HANNAH M. WHIPPLE,
*Administratrix of the estate of Effinger E. Whipple, deceased.*

Witnesses:
A. R. CUNNINGHAM,
M. M. ASHLEY.